United States Patent
Takahashi et al.

[11] Patent Number: 5,862,000
[45] Date of Patent: Jan. 19, 1999

[54] PHOTOGRAPHIC LENS SYSTEM

[75] Inventors: Toshio Takahashi, Hachioji; Seiji Shimizu, Omiya; Hideyasu Takato, Hino, all of Japan

[73] Assignee: Olympus Optical Co., Ltd., Tokyo, Japan

[21] Appl. No.: 814,056

[22] Filed: Mar. 10, 1997

[30] Foreign Application Priority Data

Mar. 22, 1996 [JP] Japan .................................. 8-091837

[51] Int. Cl.$^6$ ........................................................ G02B 9/34
[52] U.S. Cl. ................................................................. 359/773
[58] Field of Search ..................................... 359/753, 773

[56] References Cited

U.S. PATENT DOCUMENTS

| | | | |
|---|---|---|---|
| 4,413,888 | 11/1983 | Sato ........................................ | 359/773 |
| 4,477,155 | 10/1984 | Sato et al. ............................. | 359/773 |
| 4,606,607 | 8/1986 | Kurihara ................................ | 359/773 |
| 4,653,870 | 3/1987 | Imaizumi et al. ..................... | 359/773 |
| 4,688,903 | 8/1987 | Fujita et al. .......................... | 359/773 |
| 4,792,216 | 12/1988 | Kudo ..................................... | 359/773 |
| 5,499,142 | 3/1996 | Ohshita ................................. | 359/773 |

FOREIGN PATENT DOCUMENTS 55-073014   6/1980   Japan .
57-116313   7/1982   Japan .

Primary Examiner—Georgia Epps
Assistant Examiner—Dawn-Marie Bey
Attorney, Agent, or Firm—Pillsbury Madison & Sutro LLP

[57] ABSTRACT

A photographic lens system which is composed, in order from the object side, of a first lens element having a positive refractive power, a second lens element having a negative refractive power, a third lens element having a positive refractive power, and a fourth lens element which has an aspherical surface on the image side and a negative refractive powers. An aperture stop is disposed between the second lens element and the third lens element or between the third lens element and the fourth lens element. This photographic lens system has a large aperture, favorable optical performance within a photographing range from infinite distance to an extremely short distance, a compact size and a simple composition, and can be manufactured at a low cost.

25 Claims, 4 Drawing Sheets

PHOTOGRAPHIC LENS SYSTEM

BACKGROUND OF THE INVENTION

1. Field of the Invention

The present invention relates to a photographic lens system which has a wide photographing field angle of approximately 64°, a small F number on the order of 2.8, a telephoto ratio of approximately 1.1 or lower, a compact size, optical performance scarecely degraded within a photographing range from infinite distance to a short distance on the order of 0.35 m, and provides images of high qualities.

2. Description of the Prior Art

In recent years, image pickup lens systems used in photographing silver salt cameras and still video cameras have been configured mainly as zoom lens systems which can conveniently cope with various photographing conditions. However, zoom lens systems hardly have total lengths as short as those of lens systems having fixed focal points, tend to have small F numbers at tele positions in particular when they are configured to be compact, and cannot form images of satisfactory qualities.

Accordingly, users desire pocketably compact and cute cameras more and more strongly and more compact cameras that use bright lens systems with fixed focal points that form images of high quality.

There are conventionally known photographic lens systems, each of which are composed of four lens components of four lens elements, like the lens system according to the present invention. For example, a lens system disclosed by Japanese Patent Kokai Publication No. Sho 55-73014 is composed of four lens components of four lens elements. However, these conventional photographic lens systems are dark, or have F numbers on the order of 3.5 to 5.6, and cannot sufficiently satisfy the users' recent desire for shorter minimum photographing distances, or exhibit favorable optical performance at their minimum photographing distances.

Further, a lens system disclosed by Japanese Patent Kokai Publication No. Sho 57-116313 has a composition similar to that of the photographic lens system according to the present invention and a small F number of F2.8, but allows an amount of marginal rays to be reduced by stopping down, thereby producing a phenomenon that four corners of a film are darkened in the stop down condition. In addition, the conventional lens system allows aberrations to be varied remarkably from infinite object distance to a short object distance and cannot provide photographs desired by users when it is used for photographing objects located at extremely short distances in particular.

For configuring a compact camera using a photographic lens system having a fixed focal point so as to satisfy the users' desire for photographing objects located at a minimum photographing distance, it is necessary to design the lens system to permit photographing an object located an extremely short distance (on the order of 0.35 m).

SUMMARY OF THE INVENTION

A primary object of the present invention is to provide a photographic lens system which has an F number of 2.8, or a large aperture, favorable optical performance within a photographing range from infinite distance to an extremely short distance, a compact size and a simple composition.

The photographic lens system according to the present invention is composed of four lens components of four lens elements, in order from the object side, a first lens element having a positive refractive power, a second lens element having a negative refractive power, an aperture stop, a third lens element having a positive refractive power and a fourth lens element which has an aspherical surface on the image side and a negative refractive power, and is configured so as to satisfy the following conditions (1), (2) and (3):

$$0.4 < d_6/\Sigma d < 0.6 \quad (1)$$

$$1.4 < -f_4/f < 3.0 \quad (2)$$

$$1.7 < n_3 < 1.85 \quad (3)$$

The photographic lens system according to the present invention is composed of four lens components of four lens elements, in order from the object side, a first lens element having a positive refractive power, a second lens element having a negative refractive power, a third lens element having a positive refractive power, an aperture stop and a fourth lens element which has an aspherical surface on the image side and a negative refractive power; and is configured so as to satisfy the following conditions (1), (2) and (3-1):

$$0.4 < d_6/\Sigma d < 0.6 \quad (1)$$

$$1.4 < -f_4/f < 3.0 \quad (2)$$

$$1.48 < n_3 < 1.7 \quad (3-1)$$

DETAILED DESCRIPTION OF THE PREFERRED EMBODIMENTS

Figure 1:
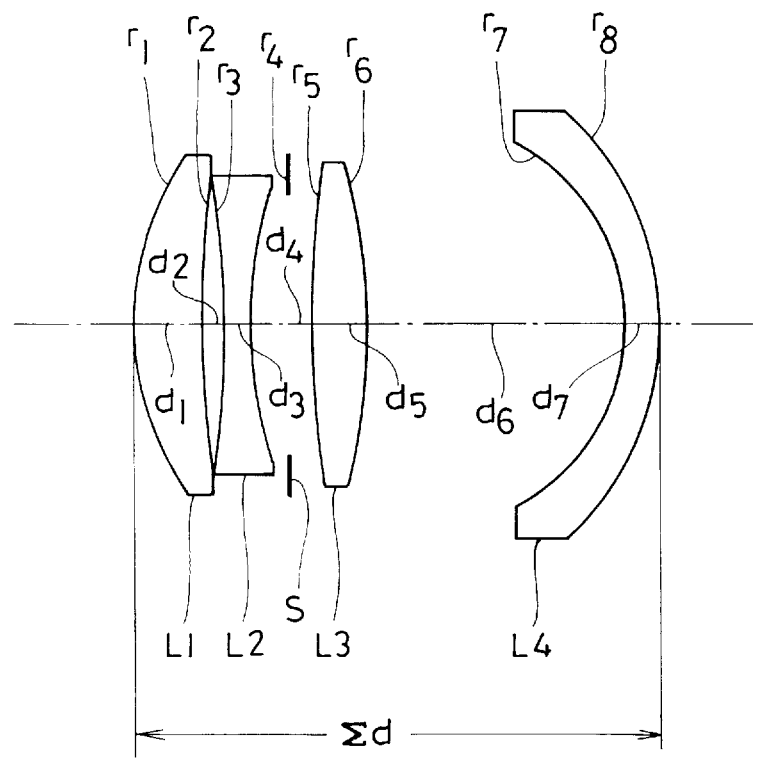
FIGS. 1 through 6 show sectional views illustrating compositions of first through sixth embodiments of the photographic lens system according to the present invention.
Figure 2:
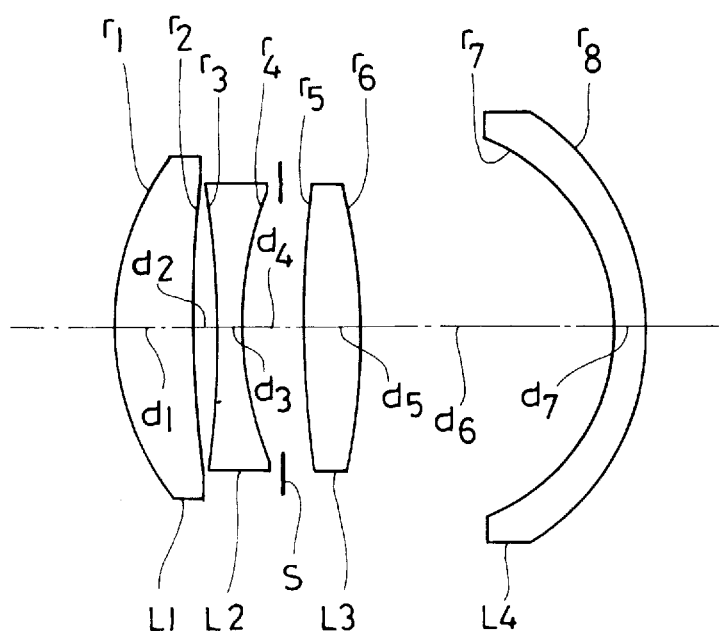
Figure 3:
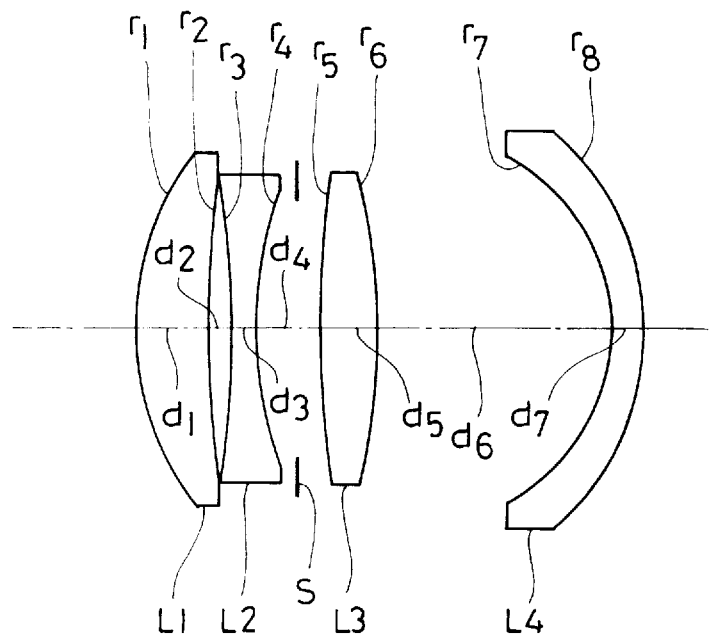
Figure 4:
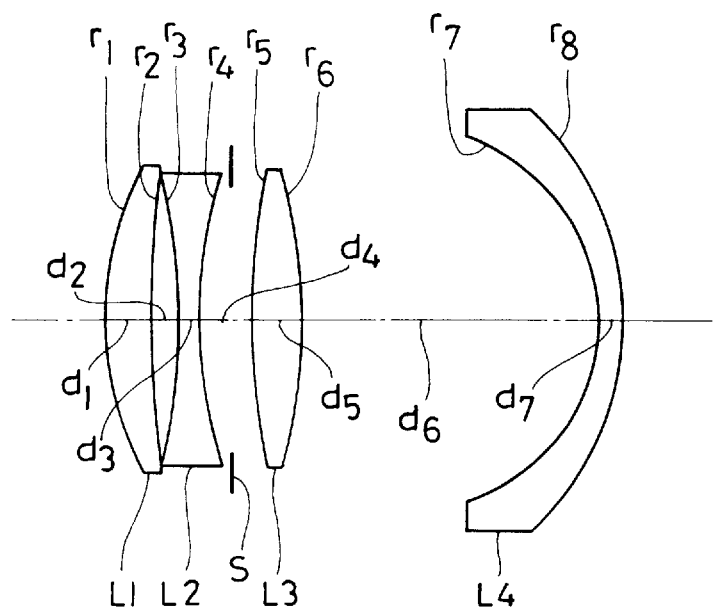

The photographic lens system according to the present invention is composed of four lens components of four lens element. For example as shown in FIG. 1, in order from the object side, is a first lens element having a positive refractive power, a second lens element having a negative refractive power, an aperture stop, a third lens element having a positive refractive power and a fourth lens element which has an aspherical surface on the image side and a negative refractive power; and configured so as to satisfy the following conditions (1), (2) and (3):

$$0.4 < d_6/\Sigma d < 0.6 \quad (1)$$

$$1.4 < -f_4/f < 3.0 \quad (2)$$

$$1.7 < n_3 < 1.85 \quad (3)$$

wherein the reference symbol $d_6$ represents an airspace reserved between the third lens element and the fourth lens element, the reference symbol $\Sigma d$ designates a distance as measured from a first surface of the photographic lens system to its final surface, the reference symbol $f_4$ denotes a focal length of the fourth lens element, the reference symbol f represents a focal length of the photographic lens system as a whole and the reference symbol $n_3$ designates a refractive index of the third lens element.

A telephoto type lens system like the photographic lens system according to the present invention is advantageous for being configured so as to have a small total length. Further, for shortening not only a total length but also a composition length (a distance as measured from a first surface to a final surface of the lens system), it is desirable to compose it of four lens elements which are the minimum required for the lens system.

Figure 7:
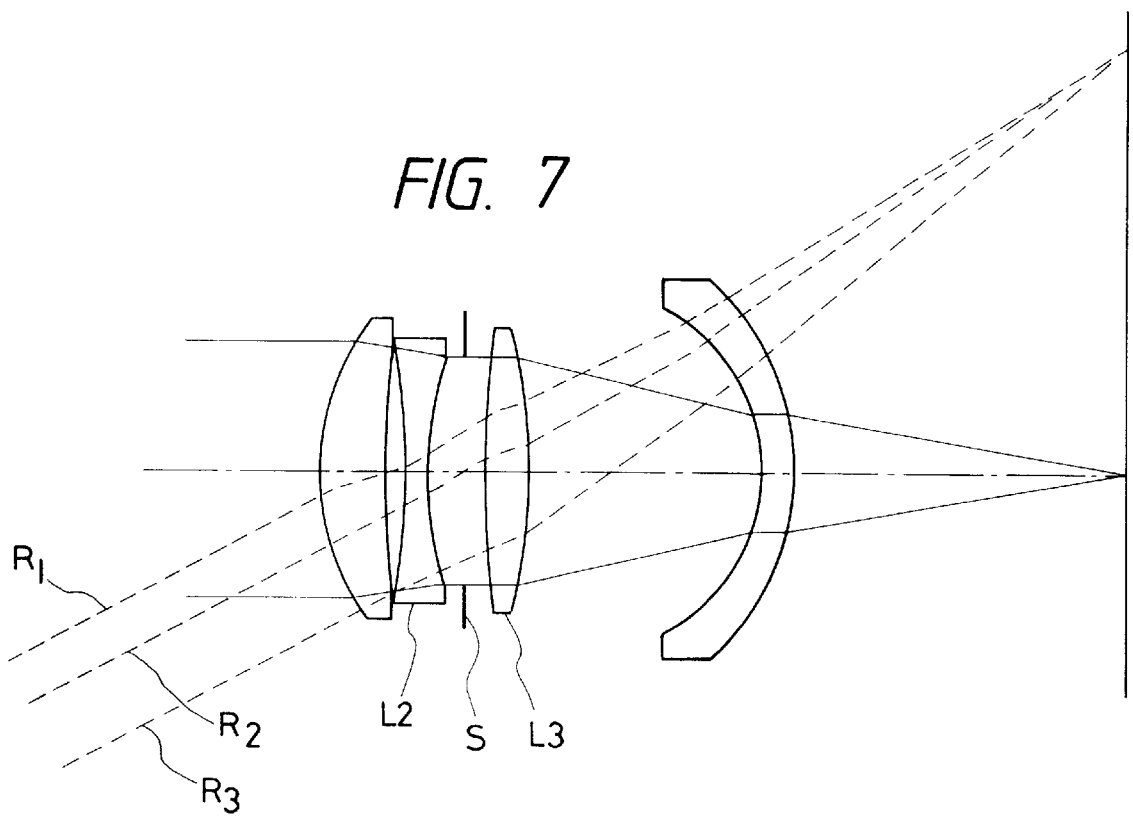
FIGS. 7 and 8 show sectional views each illustrating a relationship among an aperture stop, paraxial rays and offaxial rays.
Figure 8:
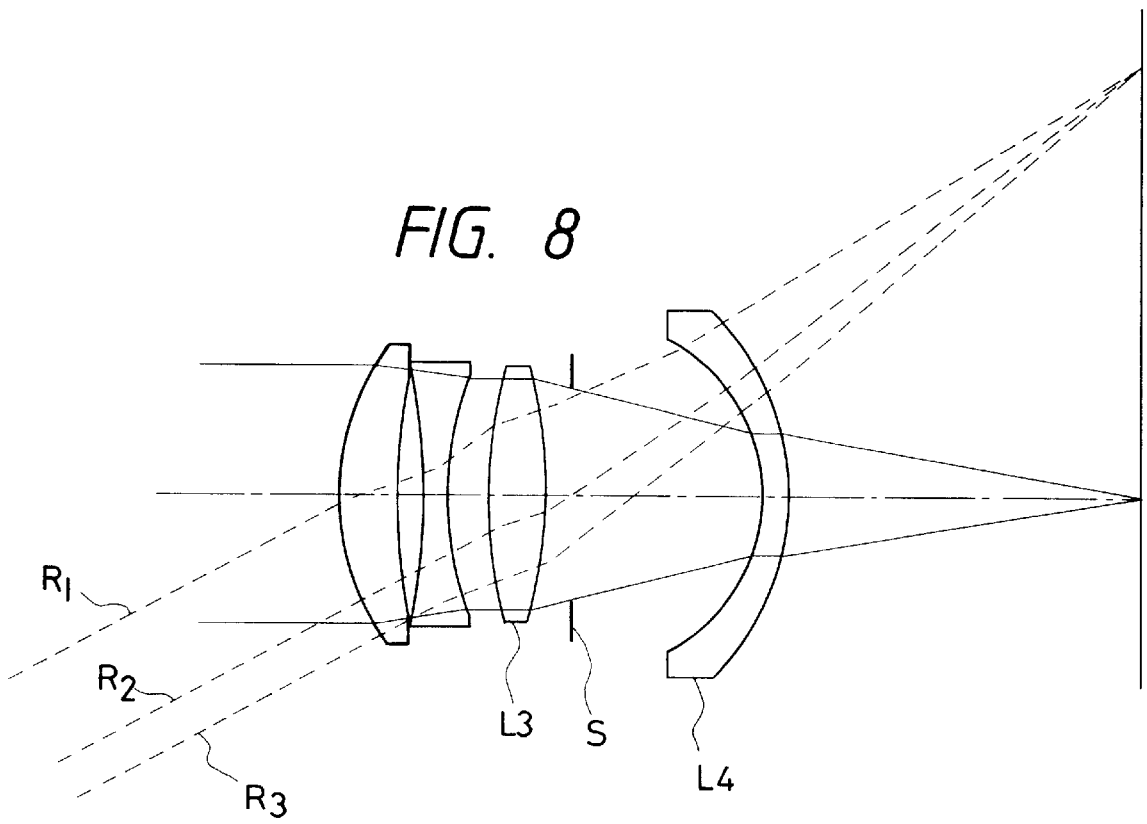

In a first composition of the photographic lens system according to the present invention, the aperture stop is located between the second lens element and the third lens element as described above since this location of the aperture stop is advantageous for reserving marginal rays in a sufficient amount. Each of FIGS. 7 and 8 shows relationship of a location of an aperture stop, axial rays, and offaxial rays in the photographic lens system according to the present invention. FIG. 7 shows an example wherein an aperture stop S is located between a second negative lens element $L_2$ and a third positive lens element $L_3$, whereas FIG. 8 illustrates another example wherein the aperture stop S is located between the third lens element $L_3$ and a fourth lens element $L_4$. As seen from these drawings, rays $R_1$, $R_2$ and $R_3$ (an upper ray $R_1$, a chief ray $R_2$ and a lower ray $R_3$) are scarecely eclipsed, whereby an amount of the marginal rays is not reduced by reducing a diameter of the aperture stop (stopping down the lens system) when the aperture stop S is located between the second lens element $L_2$ and the third lens element $L_3$ as shown in FIG. 7. When the aperture stop S is located between the third lens element $L_3$ and the fourth lens element $L_4$, on the other hand, the upper ray $R_1$ is eclipsed and the amount of the marginal ray is reduced by reducing the diameter of the aperture stop S.

When the aperture stop is located between the second lens element $L_2$ and the third lens element $L_3$ as shown in FIG. 7, an amount of the axial rays is not reduced so remarkably as in FIG. 8 by reducing the diameter of the aperture stop S. That is to say, the amount of reservation of marginal rays is improved in FIG. 7. The amount of reservation can be remarkably improved in the stop down condition in particular by disposing the aperture stop between the second lens element and the third lens element.

For a lens system which is composed of four lens elements like the photographic lens system described above, it is preferable to select a plastic lens element as the fourth lens element. By selecting a plastic lens element as the fourth lens element, it can be manufactured at a low cost even when an aspherical surface is formed on the fourth lens element. It is desirable to form an aspherical surface on an image side of the fourth lens element since a central light bundle is farthest from a marginal light bundle on the image side surface of the fourth lens element, whereby an aspherical surface formed as the image side surface of the fourth lens element exhibits a highest effect and degradation of optical performance due to manufacturing errors or low precision of the aspherical surface is suppressed to a minimum level when it is used as the image side surface of the fourth lens element.

The photographic lens system according to the present invention is configured so as to satisfy the above-mentioned conditions (1) through (3) for maintaining high optical performance.

The condition (1) is adopted for correcting aberrations favorably and configuring the photographic lens system to be compact.

If the lower limit of 0.4 of the condition (1) is not satisfied, spherical aberration will be overcorrected and coma can hardly be corrected. When spherical aberration is overcorrected, photographs will be due to blurring, thereby making it difficult to make most of the characteristics of the large-aperture lens system having an F number of 2.8. Further, astigmatism will be undercorrected remarkably in the meridional direction in particular.

If the upper limit of 0.6 of the condition (1) is exceeded, spherical aberration will be undercorrected, astigmatism will be overcorrected and the compositional length of the lens system will be increased, thereby enlarging a diameter of the fourth lens element and making it impossible to satisfy the desire for compact cameras.

The condition (2), which defines a focal length of the fourth lens element, has been adopted to prevent the photographic lens system from having a large total length and minimize variations of aberrations caused by focusing the lens system onto an object located at a short distance as well as to prevent deviations of an imaging location due to variations of environmental factors such as temperature and humidity.

If the lower limit of 1.4 of the condition (2) is not satisfied, the fourth lens element will have too strong a refractive power, which is suited for shortening the total length of the photographic lens system, but remarkable variations of aberrations, astigmatism and coma, in particular, will be produced by moving the photographic lens system as a whole for focusing it onto an object located at a short distance. This will make it impossible to satisfy users' recent desire for a shorter minimum photographing distance. In selecting a method for focusing the photographic lens system on an object located at a short distance, we adopted a premise that the lens system is moved as a whole since this method facilitates the mechanical structure, reducing the size and lowering the a manufacturing cost of the photographic lens system. The term short distance means a photographing distance of 0.35 m at which the lens system is set at a photographing magnification on the order of $-1/8$x. If the lower limit of the condition (2) is not satisfied deviation of the imaging location will be large and the image quality will be degraded due to environmental variations (variations of temperature and humidity).

If the fourth lens element has a focal length exceeding the upper limit of 3.0 of the condition (2), it will be advantageous to obtain optical performance that is favorable for objects located at short distances and reduce the deviation of the imaging location due to environmental variations, but the photographic lens system will have a large total length contrary to the users' desire.

By maintaining $f_4/f$ within the range defined by the condition (2), it is possible to configure the photographic lens system to be compact, and to obtain not only the effect of reducing variations of aberration caused by focusing the lens system onto objects located within a range from infinite distance to a minimum distance (on the order of 0.35 m) and the effect of suppressing the degradation of optical performance by the influences due to the environmental variations.

The condition (3) contributes mainly for correcting sagittal coma. When an aperture stop is disposed between a second lens element, and a third lens element as in the first composition of the photographic lens system according to the present invention, it is remarkably difficult to correct sagittal coma since the amount of rays is increased in a direction where the sagittal light bundle passes. It is possible to control or correct sagittal coma to a certain degree by undercorrecting spherical aberration. This correcting effect is enhanced by selecting a higher refractive index for the third lens element. Such a high refractive index produces an additional effect of suppressing an astigmatic difference at marginal portions of the film. For correcting sagittal coma and an astigmatic difference, it is effective to configure a lens system so as to satisfy the condition (3).

For obtaining the effects described above, it is more desirable to configure the photographic lens system according to the present invention so as to satisfy, in place of the condition (1), the following condition (1-1):

$$0.45 < d_6/\Sigma d < 0.58 \tag{1-1}$$

By modifying the upper limit of the condition (1) to 0.58 as defined by the condition (1-1), it is possible to shorten the diameter and compositional length of the fourth lens element, thereby yielding a thinner camera body. The aberration correcting effect described above can be enhanced by modifying the lower limit of the condition to 0.45 as defined by the condition (1-1).

Further, it is desirable to configure the photographic lens system according to the present invention so as to satisfy at least one of the following conditions (4), (5), (6) and (7):

$$0.3 < -r_4/r_3 < 0.75 \tag{4}$$

$$0.5 < -r_6/r_5 < 0.8 \tag{5}$$

$$1.65 < n_1 < 1.85 \tag{6}$$

$$1.48 < n_2 < 1.75 \tag{7}$$

wherein the reference symbols $r_3$ and $r_4$ represent radii of curvature on an object side surface and an image side surface respectively of the second lens element, the reference symbols $r_5$ and $r_6$ designate radii of curvature of an object side surface and an image side surface of the third lens element, and the reference symbols $n_1$ and $n_2$ denote refractive indices of the first lens element and the second lens element respectively.

The condition (4) has been adopted for correcting spherical aberration and coma with good balance. If the upper or lower limit of this condition is not satisfied, the second lens element will produce spherical aberration and coma in amounts that are too large for to be corrected by the third lens element.

The condition (5) relates to spherical aberration and sagittal coma. If the upper or lower limit of this condition is not satisfied, it will be difficult to correct these aberrations.

The condition (6) is required for correcting coma. If the lower limit of 1.65 of this condition is not satisfied, it will be more or less difficult to correct coma. If the upper limit of 1.85 is exceeded, in contrast, the first lens element will have a high refractive index that requires an expensive glass material.

The condition (7) is required for correcting coma. If the upper limit of 1.75 of this condition is exceeded, it will be more or less difficult to correct coma and the second lens element will undesirably require an expensive glass material. If the lower limit of 1.48 is not satisfied, in contrast, it will be difficult to correct coma.

When a plastic lens element is selected as the fourth lens element, it is desirable to use a lens element made of a plastic material having a low hygroscopicity, for example ZEONEX®, so that the deviation of the imaging location can be sufficiently reduced.

A second composition which can accomplish the objects of the present invention will be described below. Speaking concretely, the photographic lens system according to the present invention that has the second composition is composed of four lens components of four lens elements. They are, in order from the object side, a first lens element having a positive refractive power, a second lens element having a negative refractive power, a third lens element having a positive refractive power, an aperture stop and a fourth lens element which has an aspherical image side surface and a negative refractive power; and configured so as to satisfy the following conditions (1), (2) and (3-1):

$$0.4 < d_6/\Sigma d < 0.6 \tag{1}$$

$$1.4 < f_4/f < 3.0 \tag{2}$$

$$1.48 < n_3 < 1.7 \tag{3-1}$$

For a telephoto type lens system such as the photographic lens system according to the present invention, it is desirable as described above to compose it of a minimum number of lens elements, or four lens elements since this composition is advantageous for shortening not only a total length but also a compositional length (the distance as measured from the first surface to the final surface of the lens system). The second composition wherein the aperture stop is located between the third lens element and the fourth lens element makes it possible to simplify the structure of the lens barrel. In order words, the first through fourth lens elements, or at least the first through third lens elements disposed on the object side can be accommodated in a single lens barrel, thereby obtaining an advantage of reducing influences due to low assembling precision, eccentricities or manufacturing errors.

Further, it is desirable to use a plastic lens element as the fourth lens element. When a plastic lens element is used as the fourth lens element, it can be manufactured at a low cost even when an aspherical surface is used on this lens element.

It is desirable as described above to use an aspherical surface as an image side surface of the fourth lens element since an aspherical surface located on the final surface where a central light bundle and a marginal light bundle are farthest from each other exhibits a high effect, and functions to favorably correct offaxial aberrations such as distortion and coma which are produced by selecting a low refractive index for the third lens element as defined by the condition (3-1), thereby minimizing degradation of optical performance due to manufacturing errors or low precision of the aspherical surface as in the case of the first composition described above wherein the aperture stop is located between the second lens element and the third lens element.

By configuring the photographic lens system which has the second composition wherein the aperture stop is located between the third lens element and the fourth lens element so as to satisfy the above-mentioned conditions (1) and (2), it is possible to obtain effects similar to those of the photographic lens system according to the present invention which has the first composition wherein the aperture stop is located between the second lens element and the third lens element. If the upper or lower limit of the condition (1) is exceeded, or if the upper or lower limit of the condition (2) is exceeded, undesirable results will be brought about for reasons similar to those described above.

When the aperture stop is located between the third lens element and the fourth lens element in the photographic lens system according to the present invention, an amount of sagittal rays passing through the lens system is reduced, thereby facilitating correction of sagittal coma. Therefore, the third lens element does not need to have a refractive index $n_3$ higher than required, and sagittal coma can be favorably corrected and the lens system can be manufactured at a low cost simply by configuring the third lens element so as to satisfy the condition (3-1) in place of the condition (3).

Further, sagittal coma can be corrected more favorably by configuring the photographic lens system so as to satisfy, in place of the condition (1), the following condition (1-2):

$$0.45 < d_6/\Sigma d < 0.55 \qquad (1\text{-}2)$$

By modifying the upper limit of the condition (1) to 0.55 to narrow the range, it is possible to further reduce the diameter of the fourth lens element and shorten the compositional length of the lens system, thereby providing a thinner a camera body. Further, the effect for correcting spherical aberration and coma described above can be enhanced by modifying the lower limit of the condition (1) to 0.45.

Furthermore, it is more effective to configure the photographic lens system so as to satisfy, in place of the condition (2), the following condition (2-1):

$$1.6 < -f_4/f < 3.0 \qquad (2\text{-}1)$$

Variations of aberrations caused by focusing the photographic lens system onto objects located within a range from an infinite distance to an extremely short distance can be further reduced by modifying the lower limit of the condition (2) to 1.6 so as to narrow the range defined by this condition.

Moreover, it is desirable to configure the photographic lens system which has the composition described above so as to satisfy the following conditions:

$$0.3 < -r_4/r_3 < 0.65 \qquad (4\text{-}1)$$

$$0.8 < -r_6/r_5 < 1.2 \qquad (5\text{-}1)$$

$$1.65 < n_1 < 1.85 \qquad (6)$$

$$1.48 < n_2 < 1.75 \qquad (7)$$

The condition (4-1) is required, similarly to the condition (4), for correcting spherical aberration and coma with good balance. By modifying the upper limit of the condition (4) to 0.65, it is possible to facilitate correction of coma, and to correct spherical aberration and coma with good balance in the photographic lens system according to the present invention wherein the aperture stop is located between the third lens element and the fourth lens element (the second composition) in particular.

The condition (5-1) is required for correcting coma and distortion. In the case wherein the aperture stop is disposed between the third lens element and the fourth lens element (the second composition), the fourth lens element has a negative refractive power and distortion is a little remarkable. Correction of distortion is facilitated when the condition (5-1) is satisfied. If the upper limit of the condition (5-1) is not satisfied, it will be difficult to correct distortion. If the lower limit of 0.8 of the condition (5-1) is not satisfied, in contrast, it will be difficult to correct coma. Further, by setting $|r_6/r_5|$ at 1.0, the third lens element can easily be machined or manufactured at a low cost.

The conditions (6) and (7) are the same as those defined for the first composition wherein the aperture stop is disposed between the second lens element and the third lens element, and adopted for the same purposes or reasons described below.

The condition (6) relates to correction of coma. If the upper limit of this condition is exceeded, the first lens element will require an expensive glass material. If the lower limit of this condition is exceeded, it will be difficult to correct coma.

The condition (7) relates to correction of coma. If the upper limit of this condition is exceeded, it will be more or less difficult to correct come and a glass material will undesirably be expensive. If the lower limit of this condition is exceeded, in contrast, it will be more or less difficult to correct coma.

FIGS. 1 through 6 show sectional views illustrating compositions of embodiments of the photographic lens system according to the present invention and these embodiments have numerical data which is listed below:

Embodiment 1 f = 33.91 mm, F number = 2.89
$r_1$ = 12.0391
  $d_1$ = 2.7545     $n_1$ = 1.74320     $\nu_1$ = 49.31
$r_2$ = 50.0294
  $d_2$ = 0.9200
$r_3$ = −36.9805
  $d_3$ = 1.0000     $n_2$ = 1.72825     $\nu_2$ = 28.46
$r_4$ = 17.5343
  $d_4$ = 2.4900
$r_5$ = 40.7109
  $d_5$ = 2.2500     $n_3$ = 1.78590     $\nu_3$ = 44.19
$r_6$ = −26.0206
  $d_6$ = 10.2496
$r_7$ = −8.3616
  $d_7$ = 1.4000     $n_4$ = 1.52542     $\nu_4$ = 55.78
$r_8$ = −11.8346 (aspherical surface)
aspherical surface coefficients
K = 0, $A_2$ = 0, $A_4$ = 3.1902 × $10^{-5}$, $A_6$ = −7.6178 × $10^{-7}$
  $A_8$ = 1.0551 × $10^{-8}$, A10 = −7.6647 × $10^{-11}$
$f_b$ = 14.6687, $\Sigma d$ = 21.0641, $d_6/\Sigma d$ = 0.487, $-f_4/f$ = 1.857
$-r_6/r_5$ = 0.639, $-r_4/r_3$ = 0.474

Embodiment 2 f = 33.91 mm, F number = 2.89
$r_1$ = 11.4903
  $d_1$ = 3.2229     $n_1$ = 1.74320     $\nu_1$ = 49.31
$r_2$ = 55.4628
  $d_2$ = 0.9200
$r_3$ = −42.5784
  $d_3$ = 1.0000     $n_2$ = 1.72825     $\nu_2$ = 28.46
$r_4$ = 14.3780
  $d_4$ = 2.4900
$r_5$ = 40.8206
  $d_5$ = 2.2500     $n_3$ = 1.78590     $\nu_3$ = 44.19
$r_6$ = −28.2698
  $d_6$ = 10.0157
$r_7$ = −8.3255
  $d_7$ = 1.4000     $n_4$ = 1.52542     $\nu_4$ = 55.78
$r_8$ = −10.4661 (aspherical surface)
aspherical surface coefficients
K = 0, $A_2$ = 0, $A_4$ = 1.3091 × $10^{-5}$, $A_6$ = −1.3642 × $10^{-7}$
  $A_8$ = −4.3338 × $10^{-10}$, $A_{10}$ = −1.6080 × $10^{-11}$
$f_b$ = 14.7615, $\Sigma d$ = 21.2986, $d_6/\Sigma d$ = 0.470, $-f_4/f$ = 2.949
$-r_6/r_5$ = 0.693, $-r_4/r_3$ = 0.338

Embodiment 3 f = 33.91 mm, F number = 2.89
$r_1$ = 11.7292
  $d_1$ = 2.9493     $n_1$ = 1.72916     $\nu_1$ = 54.68
$r_2$ = 48.0953
  $d_2$ = 0.9200

-continued

Embodiment 3

$r_3 = -40.5133$
    $d_3 = 1.0000$     $n_2 = 1.69895$     $v_2 = 30.12$
$r_4 = 17.0242$
    $d_4 = 2.4842$
$r_5 = 45.1214$
    $d_5 = 2.2500$     $n_3 = 1.79952$     $v_3 = 42.24$
$r_6 = -28.1689$
    $d_6 = 9.3010$
$r_7 = -7.9116$
    $d_7 = 1.3000$     $n_4 = 1.52542$     $v_4 = 55.78$
$r_8 = -10.6395$ (aspherical surface)
aspherical surface coefficients
$K = 0, A_2 = 0, A_4 = 3.5283 \times 10^{-5}, A_6 = -1.0117 \times 10^{-6}$
    $A_8 = -1.6169 \times 10^{-8}, A_{10} = -1.4026 \times 10^{-10}$
$f_b = 15.4345, \Sigma d = 20.2044, d_6/\Sigma d = 0.460, -f_4/f = 2.072$
$-r_6/r_5 = 0.624, -r_4/r_3 = 0.420$

Embodiment 4

$f = 33.91$ mm, F number = 2.89
$r_1 = 12.4954$
    $d_1 = 1.8695$     $n_1 = 1.74320$     $v_1 = 49.31$
$r_2 = 40.0416$
    $d_2 = 1.1000$
$r_3 = -26.6883$
    $d_3 = 0.8499$     $n_2 = 1.72825$     $v_2 = 28.46$
$r_4 = 18.7158$
    $d_4 = 2.0813$
$r_5 = 29.2498$
    $d_5 = 2.0000$     $n_3 = 1.78590$     $v_3 = 44.19$
$r_6 = -22.6250$
    $d_6 = 11.7987$
$r_7 = -7.7757$
    $d_7 = 1.0000$     $n_4 = 1.52542$     $v_4 = 55.78$
$r_8 = -11.6265$ (aspherical surface)
aspherical surface coefficients
$K = 0, A_2 = 0, A_4 = 3.6322 \times 10^{-7}, A_6 = -3.6466 \times 10^{-7}$
    $A_8 = -6.4849 \times 10^{-9}, A_{10} = -2.4417 \times 10^{-11}$
$f_b = 14.6646, \Sigma d = 20.6994, d_6/\Sigma d = 0.570, -f_4/f = 1.447$
$-r_6/r_5 = 0.774, -r_4/r_3 = 0.701$

Embodiment 5

$f = 33.91$ mm, F number = 2.89
$r_1 = 11.2590$
    $d_1 = 2.5500$     $n_1 = 1.72916$     $v_1 = 54.68$
$r_2 = 33.3940$
    $d_2 = 1.0500$
$r_3 = -33.1560$
    $d_3 = 1.1000$     $n_2 = 1.67270$     $v_2 = 32.10$
$r_4 = 14.3530$
    $d_4 = 1.9300$
$r_5 = 22.6270$
    $d_5 = 2.7000$     $n_3 = 1.67003$     $v_3 = 47.25$
$r_6 = -22.6270$
    $d_6 = 9.5600$
$r_7 = -8.2610$
    $d_7 = 1.2000$     $n_4 = 1.52542$     $v_4 = 55.78$
$r_8 = -11.7468$ (aspherical surface)
aspherical surface coefficients
$K = 0, A_2 = 0, A_4 = 4.4178 \times 10^{-7}, A_6 = -9.8358 \times 10^{-7}$
    $A_8 = -1.6111 \times 10^{-8}, A_{10} = -4.4144 \times 10^{-11}$
$f_b = 15.6931, \Sigma d = 20.09, d_6/\Sigma d = 0.476, -f_4/f = 1.773$
$-r_6/r_5 = 1, -r_4/r_3 = 0.433$

Embodiment 6

$f = 33.91$ mm, F number = 2.89
$r_1 = 11.7415$
    $d_1 = 2.0000$     $n_1 = 1.72916$     $v_1 = 54.68$
$r_2 = 32.9156$
    $d_2 = 1.2000$
$r_3 = -28.9060$
    $d_3 = 1.1000$     $n_2 = 1.67270$     $v_2 = 32.10$
$r_4 = 14.0087$
    $d_4 = 1.7625$
$r_5 = 20.0000$
    $d_5 = 2.5429$     $n_3 = 1.67003$     $v_3 = 47.25$
$r_6 = -21.0000$
    $d_6 = 11.7400$
$r_7 = -7.8046$
    $d_7 = 1.0000$     $n_4 = 1.52542$     $v_4 = 55.78$
$r_8 = -10.8237$ (aspherical surface)
aspherical surface coefficients
$K = 0, A_2 = 0, A_4 = 4.4178 \times 10^{-5}, A_6 = -9.8358 \times 10^{-7}$
    $A_8 = -1.6111 \times 8^{-9}, A_{10} = -8.4144 \times 10^{-11}$
$f_b = 14.7104, \Sigma d = 21.3455, d_6/\Sigma d = 0.550, -f_4/f = 1.773$
$-r_6/r_5 = 1.05, -r_4/r_3 = 0.485$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

The first through fourth embodiments have compositions illustrated in FIGS. 1 through 4 respectively. Each of these embodiments is composed of four lens components of four lens elements, in order from the object side, a first positive meniscus lens element $L_1$ having a convex surface on the object side, a second biconcave lens element $L_2$, an aperture stop, a third biconvex lens element $L_3$ and a fourth negative meniscus lens element $L_4$ which has a convex surface on the image side. An aspherical surface is used as the image side surface of the fourth lens element. That is to say, the first through fourth embodiments adopt the first composition. Each of these embodiments is focused onto an object located at a short distance by moving the lens system as a whole.

An airspace of 1.60 mm is reserved between an image side surface of the second lens element and the aperture stop in the first embodiment out of the embodiments described above.

An airspace of 1.60 mm is reserved between an image side surface of the second lens element and the aperture stop also in the second embodiment.

An airspace of 1.59 mm is reserved between an image side surface of the second lens element and the aperture stop in the third embodiment.

An airspace of 1.28 mm is reserved between an image side surface of the second lens element and the aperture stop.

Figure 5:
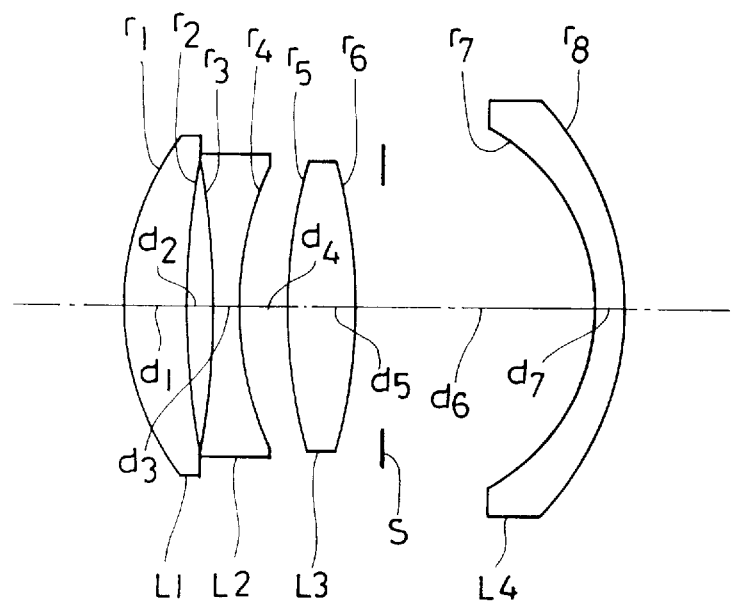
Figure 6:
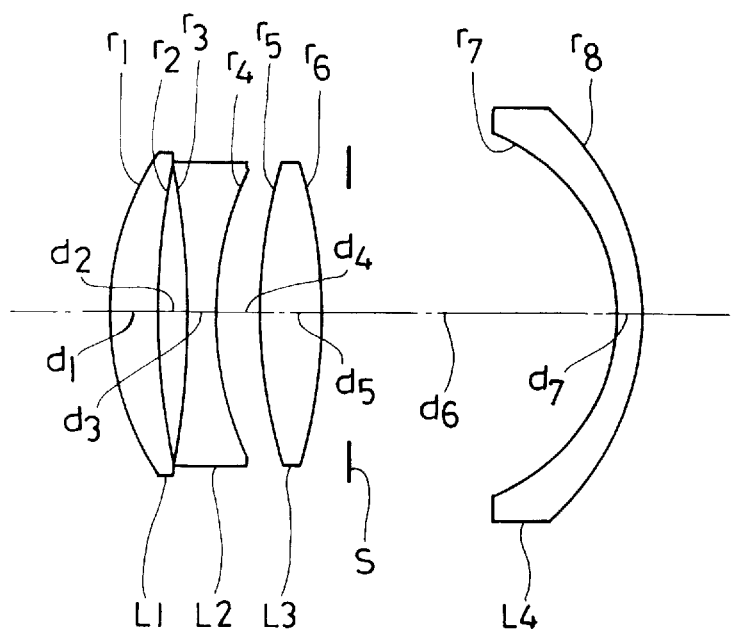

The fifth and sixth embodiments have compositions illustrated in FIGS. 5 and 6 respectively. Each of these embodiments has the second composition, or is composed of four lens components of four lens elements, in order from the object side, a first positive meniscus lens element $L_1$ having a convex surface on the object side, a second bi-concave lens element $L_2$, a third biconvex lens element $L_3$, an aperture stop and a fourth negative meniscus lens element $L_4$ having a convex surface on the image side. Each of these embodiments is a photographic lens system which has a focal length of 33.91 mm and an F number of 2.89, and uses an aspherical surface as the image side surface of the fourth lens element. Further, each of these embodiments is focused onto an object located at a short distance by moving the lens system as a whole.

In the fifth embodiment, an airspace of 1.09 mm is reserved between an image side surface of the third lens element and the aperture stop.

In the sixth embodiment, an airspace of 1.09 mm is reserved between an object side surface of the third lens element and the aperture stop.

All of the first through sixth embodiments described above have favorable optical performance.

The aspherical surfaces used in the embodiments described above have shapes expressed by the formula shown below:

$$z = \frac{y^2/r}{1 + \sqrt{1 - (K+1)(y/r)^2}} + A_2 y^2 + A_4 y^4 + A_6 y^6 + A_8 y^8 + A_{10} y^{10}$$

wherein a direction of an optical axis is taken as the z axis, a direction perpendicular to the z axis is taken as the y axis, the reference symbol r represents a radius of curvature on a portion of an aspherical surface of interest located on the optical axis, the reference symbol K designates a conical constant, and the reference symbols $A_2$, $A_4$, $A_6$, $A_8$ and $A_{10}$ denote aspherical surface coefficients.

According to the present invention, it is possible to obtain a photographic lens system which has a wide photographing field angle on the order of 64° and a large aperture of F/2, and is nevertheless composed of a small number of lens elements, exhibits sufficiently satisfactory performance within a photographing range from infinite distance to an extremely short distance and can be manufactured at a low cost.

We claim:

1. A photographic lens system composed of four lens elements in order from an object side:

a first lens element having a positive refractive power;

a second lens element having a negative refractive power;

an aperture stop;

a third lens element having a positive refractive power; and a fourth lens element which has an aspherical surface on an image side and a negative refractive power, wherein said photographic lens system satisfies the following conditions (1), (2), (3) and (7'):

$0.4 < d_6/\Sigma d < 0.6$     (1)

$1.4 < -f_4/f < 3.0$     (2)

$1.7 < n_3 < 1.85$     (3)

$1.48 < n_2 < 1.73$     (7')

wherein the reference symbol $d_6$ represents an airspace reserved between said third lens element and said fourth lens element, the reference symbol $\Sigma d$ designates a distance as measured from a first surface to a final surface of said lens system, the reference symbol $f_4$ denotes a focal length of said fourth lens element, the reference symbol f represents a focal length of said photographic lens system as a whole, the reference symbol $n_3$ designates a refractive index of the third lens element, and the reference symbol $n_2$ represents a refractive index of said second lens element.

2. A photographic lens system according to claim 1 wherein said fourth lens element is a plastic lens element.

3. A photographic lens system according to claim 1 satisfying the following condition (4):

$0.3 < -r_4/r_3 < 0.75$     (4)

wherein the reference symbols $r_3$ and $r_4$ represent radii of curvature on an object side surface and an image side surface respectively of said second lens element.

4. A photographic lens system according to claim 1 satisfying the following condition (5):

$0.5 < -r_6/r_5 < 0.8$     (5)

wherein the reference symbols $r_5$ and $r_6$ represent radii of curvature on an object side surface and an image side surface respectively of said third lens element.

5. A photographic lens system according to claim 1 satisfying the following conditions (4) and (5):

$0.3 < -r_4/r_3 < 0.75$     (4)

$0.5 < -r_6/r_5 < 0.8$     (5)

wherein the reference symbols $r_3$ and $r_4$ represent radii of curvature on an object side surface and an image side surface respectively of said second lens element, and the reference symbols $r_5$ and $r_6$ designate radii of curvature on an object side surface and an image side surface of said third lens element.

6. A photographic lens system according to claim 1 satisfying the following condition (6):

$1.65 < n_1 < 1.85$     (6)

wherein the reference symbol $n_1$ represents a refractive index of said first lens element.

7. A photographic lens system according to claim 1 satisfying the following conditions (6) and (7):

$1.65 < n_1 < 1.85$     (6)

$1.48 < n_2 < 1.75$     (7)

wherein the reference symbol $n_1$ represents a refractive index of said first lens element and the reference symbol $n_2$ designates a refractive index of said second lens element.

8. A photographic lens system according to claim 1 satisfying the following conditions (4), (5), (6) and (7):

$0.3 < -r_4/r_3 < 0.75$     (4)

$0.5 < -r_6/r_5 < 0.8$     (5)

$1.65 < n_1 < 1.85$     (6)

$1.48 < n_2 < 1.75$     (7)

wherein the reference symbols $r_3$ and $r_4$ represent radii of curvature on an object side surface and an image side surface respectively of said second lens element, the reference symbols $r_5$ and $r_6$ designate radii of curvature on an object side surface and an image side surface respectively of said third lens element, the reference symbol $n_1$ denotes a refractive index of said first lens element, and the reference symbol $n_2$ represents a refractive index of said second lens element.

9. A photographic lens system according to claim 1, wherein focusing to an object at a close distance is effected by moving the lens system as a whole to said object side.

10. A photographic lens system according to claim 1, wherein said photographic lens system forms an image of an object at a close photographing distance down to 0.35 m.

11. A photographic lens system according to claim 1, wherein said photographic lens system has an F-number smaller than 3.0.

12. A photographic lens system composed of four lens elements in order from the object side:

a first lens element having a positive refractive power;

a second lens element having a negative refractive power;

a third lens element having a positive refractive power;

an aperture stop; and a fourth lens element which has an aspherical surface on the image side and a negative refractive power, wherein said photographic lens system satisfies the following conditions (1), (2) and (3-1):

$$0.4 < d_6/\Sigma d < 0.6 \tag{1}$$

$$1.4 < -f_4/f < 3.0 \tag{2}$$

$$1.48 < n_3 < 1.7 \tag{3-1}$$

wherein the reference symbol $d_6$ represents an airspace reserved between said third lens element and said fourth lens element, the reference symbol $\Sigma d$ designates a distance as measured from a first surface to a final surface of said photographic lens system, the reference symbol f denotes a focal length of said fourth lens element, the reference symbol f represents a focal length of said photographic lens system as a whole and the reference symbol $n_3$ designates a refractive index of the third lens element.

13. A photographic lens system according to claim 12 wherein said fourth lens element is a plastic lens element.

14. A photographic lens system according to claim 12 satisfying the following condition (4-1):

$$0.3 < -r_4/r_3 < 0.65 \tag{4-1}$$

wherein the reference symbols $r_3$ and $r_4$ represent radii of curvature on an object side surface and an image side surface respectively of said second lens element.

15. A photographic lens system according to claim 12 satisfying the following condition (5-1):

$$0.8 < -r_6/r_5 < 1.2 \tag{5-1}$$

wherein the reference symbols $r_5$ and $r_6$ represent radii of curvature on an object side surface and an image side surface respectively of said third lens element.

16. A photographic lens system according to claim 12 satisfying the following conditions (4-1) and (5-1):

$$0.3 < -r_4/r_3 < 0.65 \tag{4-1}$$

$$0.8 < -r_6/r_5 < 1.2 \tag{5-1}$$

wherein the reference symbols $r_3$ and $r_4$ represent radii of curvature on an object side surface and an image side surface respectively of said second lens element, and the reference symbols $r_5$ and $r_6$ designate radii of curvature on an object side surface and an image side surface respectively of said third lens element.

17. A photographic lens system according to claim 12 satisfying the following condition (6):

$$1.65 < n_1 < 1.85 \tag{6}$$

wherein the reference symbol $n_1$ represents a refractive index of said first lens element.

18. A photographic lens system according to claim 12 satisfying the following condition (7):

$$1.48 < n_2 < 1.75 \tag{7}$$

wherein the reference symbol $n_2$ represents a refractive index of said second lens element.

19. A photographic lens system according to claim 12 satisfying the following conditions (6) and (7):

$$1.65 < n_1 < 1.85 \tag{6}$$

$$1.48 < n_2 < 1.75 \tag{7}$$

wherein the reference symbol $n_1$ represents a refractive index of said first lens element and the reference symbol $n_2$ designates a refractive index of said second lens element.

20. A photographic lens system according to claim 12 satisfying the following conditions (4-1), (5-1), (6) and (7):

$$0.3 < -r_4/r_3 < 0.65 \tag{4-1}$$

$$0.8 < -r_6/r_5 < 1.2 \tag{5-1}$$

$$1.65 < n_1 < 1.85 \tag{6}$$

$$1.48 < n_2 < 1.75 \tag{7}$$

wherein the reference symbols $r_3$ and $r_4$ represent radii of curvature on an object side surface and an image side surface respectively of said second lens element, the reference symbols $r_5$ and $r_6$ designate radii of curvature on an object side surface and an image side surface respectively of said third lens element, the reference symbol $n_1$ denotes a refractive index of said first lens element and the reference symbol $n_2$ represents a refractive index of said second lens element.

21. A photographic lens system according to claim 12, wherein a focusing to an object at a close distance is effected by moving the lens system as a whole to said object side.

22. A photographic lens system according to claim 12, wherein said photographic lens system forms an image of an object at a close photographing distance down to 0.35 m.

23. A photographic lens system according to claim 12, wherein said photographic lens system has an F-number smaller than 3.0.

24. A photographic lens system according to claim 12, wherein said photographic lens system further satisfies the following condition (1'):

$$0.47 < d_6/\Sigma d < 0.6. \tag{1'}$$

25. A photographic lens system according to claim 14, wherein said photographic lens system further satisfies the following conditions (4-1'):

$$0.43 < -r_4/r_3 < 0.65. \tag{4-1'}$$

* * * * *